March 11, 1941.  B. COHEN  2,234,859
BICYCLE STAND
Filed April 1, 1940
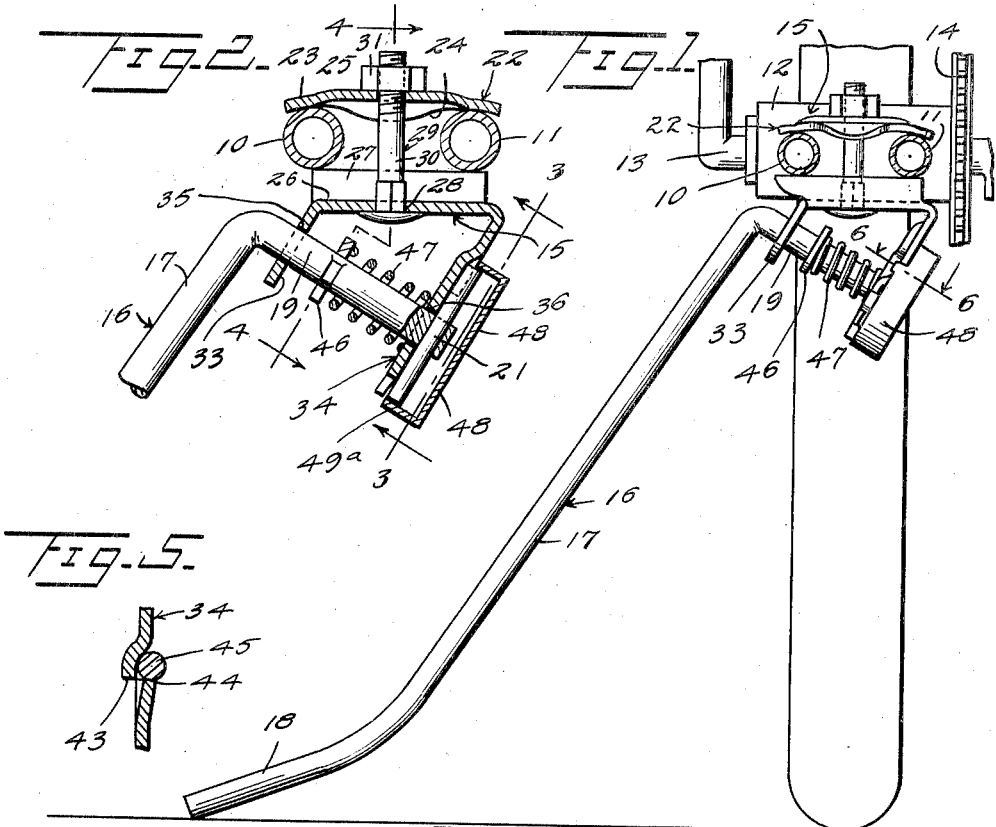
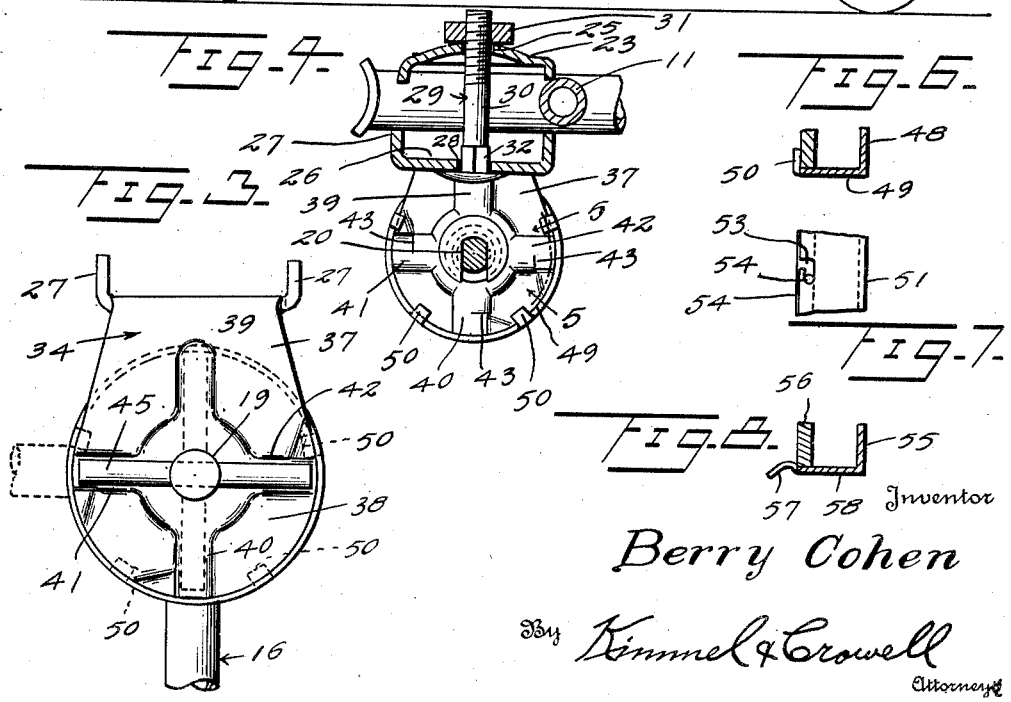
Inventor
Berry Cohen
By Kimmel & Crowell
Attorneys Patented Mar. 11, 1941

2,234,859

UNITED STATES PATENT OFFICE 2,234,859

BICYCLE STAND

Berry Cohen, Atlanta, Ga.

Application April 1, 1940, Serial No. 327,330

1 Claim. (Cl. 280—301)

This invention relates to bicycle stands and is an improvement over the bicycle stands embodied in my prior Patent No. 1,964,299, issued December 11, 1934, and my co-pending application, Serial No. 259,915, filed March 4, 1939.

In bicycle stands of the type including a shiftable supporting element, such by way of example as disclosed by the patent and application aforesaid, the supporting element is shifted from inactive to active position and vice versa, as well as being latched in such positions. Owing to the wearing off and the crystallizing of the co-related parts of the stand to constitute the latching means, the supporting element becomes loose when latched, more particularly when in inactive position, resulting in the vibration and rattling thereof which is objectionable, and to overcome the latter is the aim of this invention. To this end the bicycle stand, in accordance with this invention, includes means to thereby overcome the objection aforesaid.

The invention further aims to provide, in a manner as hereinafter set forth, a bicycle stand including means whereby the correlated parts for latching the supporting element in inactive and active positions are permanently lubricated.

The invention further aims to provide, in a manner as hereinafter set forth, a bicycle stand including means to enable one to expeditiously shift the aforesaid supporting element from inactive to active and from active to inactive position.

The invention further aims to provide, in a manner as hereinafter set forth, a bicycle stand including positive stops for limiting the extent of the movement of the supporting element when shifted from inactive to active position and vice versa.

The invention further aims to provide, in a manner as hereinafter set forth, a bicycle stand including a lubricant container arranged relative to the correlated parts of the stand constituting latching means for the supporting element aforesaid.

The invention further aims to provide, in a manner as hereinafter set forth, a bicycle stand including a spring controlled foldable and extendible supporting element capable of being selectively latched in folded and extended positions, a latching member carried by said element, selectable keepers for correlation with said member and positive stops correlated with certain of the keepers for limiting the extent of the foldable and extendible movements of said element.

The invention further aims to provide, in a manner as hereinafter set forth, a bicycle stand which is simple in its construction and arrangement, strong, compact, durable, conveniently arranged in supporting and non-supporting positions relative to the bicycle, thoroughly efficient in its use, readily installed with respect to the frame of the bicycle, quickly assembled and comparatively inexpensive to manufacture.

Embodying the aims aforesaid and others which may hereinafter appear, the invention consists of the novel construction, combination and arrangement of parts as will be more specifically described and illustrated in the accompanying drawing, wherein is shown an embodiment of the invention, but it is to be understood that changes, variations and modifications may be resorted to which fall within the scope of the invention as claimed.

In the drawing:

Figure 1 is a fragmentary view in rear elevation and partly in transverse section of a bicycle showing the adaptation therewith of a stand in accordance with this invention, the stand being shown in rear elevation and extended to active or supporting position.

Figure 2 is a fragmentary view in transverse section, upon an enlarged scale of the stand as applied to the frame of the bicycle.

Figure 3 is a section on line 3—3 Figure 2.

Figure 4 is a section on line 4—4 Figure 2.

Figure 5 is a section on line 5—5 Figure 4.

Figure 6 is a section on line 6—6 Figure 1.

Figure 7 is a detail in vertical section of a modified form of lubricant container, and Figure 8 is a detail in vertical section of still another modified form of lubricant container.

Referring to the drawing, 10 and 11 indicate a pair of horizontally disposed spaced parallel tubular bars of a bicycle frame which are secured at their forward ends to the hub or housing 12 for the shaft 13 which carries the main driving sprocket 14.

The bicycle stand, in accordance with this invention is generally indicated at 15 and it is clamped to and depends from the bars 10, 11. The stand 15 is foldable and extendible and when extended acts to maintain the bicycle in substantially an upright position.

The stand 15 includes a spring controlling latchable, foldable and extendible elongated supporting leg, member or element 16 formed of an intermediate inclined portion 17, a foot portion 18 disposed at an angle to the outer end of portion 17 and a shaft portion 19 disposed at an angle to the inner end of the portion 17. The shaft portion 19 extends inwardly from the inner end of and at a downward inclination with respect to the portion 17. When the stand 15 is active that is to say extended to support the bicycle in an upright position, the portion 17 of leg 16 inclines downwardly and outwardly from its inner to its outer end and the foot portion 18 inclines downwardly and outwardly from its point of mergence with the portion 17. The position of the leg 16 when in supporting position is shown by Figure 1. The shaft portion 19 of leg 16 is flattened intermediate its end, as at 20 and formed with an opening 21 in proximity to its inner end.

The stand includes a suspension structure generally indicated at 22 which is mounted against the upper and lower faces of the bars 10, 11, disposed between the latter and bridges the space between said bars. The structure 22 includes an upper clamping member 23 of arcuate contour lengthwise and seating on the tops of the bars 10, 11. The member 23 is formed with depending side flanges 24 arranged between the bars 10, 11 and a centrally arranged opening 25. The structure 22 includes a lower clamping member 26 of rectangular contour formed with upstanding side flanges 27 which bear against the bottoms of the bars 10, 11 and with a squared opening 28 centrally thereof. The structure 22 includes a coupling device 29 for connecting the members 23, 26 together and for binding or clamping them against the bars 10, 11. The device 29 consists of a headed threaded bolt 30 and a nut 31. The shank of bolt is passed upwardly through the openings 28, 25 and extends above the member 23. The nut 31 threadedly engages with the upper end of the bolt and is screwed home against the upper face of member 23. The head of bolt 30 bears against the lower face of member 26. The shank of the bolt has a squared portion 32 arranged in the opening 28 to prevent the turning of the bolt. When the nut is screwed home it correlates with the bolt head for fixedly securing the structure 22 to bars 10, 11. The bolt 30 extends upwardly between the bars 10, 11.

The structure 22 suspends a pair of inclined hangers 33, 34 which are integral with the ends of the member 26. The hanger 23 is of less length than the hanger 34 and extends downwardly at an outward inclination with respect to that end of member 26 with which it is integral. The hanger 33 centrally thereof is formed with an opening 35 having its wall disposed at an upward inclination from rear to front. The hanger 34 is disposed at an inclination corresponding to the inclination of the hanger 33 and it is formed with an opening 36 aligning with the opening 35. The wall of opening 36 inclines upwardly from rear to front. The hanger 34 includes an upper tapered portion 37 and a lower portion 38 of a contour greater than a half circle but less than a complete circle. The opening 36 is disposed substantially centrally of the portion 38. The hanger 34 is formed with detents 39, 40, 41 and 42 disposed in right angular relation. The detent 39 aligns with the detent 40 and said detents 39, 40 coact to form a keeper for a latching member to be referred to. The detent 41 aligns with the detent 42 and said detents 41, 42 coact to form a keeper for the latching member aforesaid. The detent 39 throughout in cross section corresponds in contour to the segmental of a circle. The detents 40, 41 and 42 have their outer portions in cross section correspond in contour to the segment of a circle.

The detents 40, 41, 42 intermediate their ends are transversely slitted as at 43 and the inner portions of said detents 40, 41, 42 freed by the slits are bent inwardly of and inset relative to their outer portions to form positive stops 44 for a purpose to be referred to.

The shaft portion 19 of the leg 16 extends inwardly through the openings 35, 36 and has its inner terminal portion extended from the portion 38 of hanger 34. Extending through the opening 21 in and secured to the shaft portion 19 of the leg 16 is a latching member 45 projecting laterally in opposite directions from the said shaft portion 19, and the latter has the flattened part 20 thereof arranged between and spaced from the hangers 33, 34. Forced upon and fixedly attached to the part 20 of shaft portion 19 is a split washer 46 which constitutes an abutment. There is correlated with the leg 16 a controlling spring 47 therefor. The spring 47 encompasses the said shaft portion 19 and is interposed between the washer 46 and the portion 38 of hanger 34.

When the leg 16 is extended to support the bicycle upright the latching member 45 engages with the keeper means provided by the detents 39, 40 and is latched and releasably maintained in such keeper means by the action of spring 47. When the leg 16 is folded to an inactive position the latching member 45 engages in the keeper means provided by the detents 41, 42 and is latched and releasably maintained in such position by the action of the spring 47. The latter constantly urges the latching member 45 to contact with the hanger 34. When the leg 16 is shifted to extended or supporting position such movement is limited by latching member 45 engaging the positive stop formed by the inset portion of the detent 40. When the leg 16 is moved to inactive or folded position, such movement is limited by the latching member 45 engaging the positive stops 44 formed by the inset portions of the detents 41, 42. The stops 44 prevent the latching member 45 from overriding the detents when the leg 16 is shifted to and from active position.

The stand includes a container 48 for receiving a lubricant preferably in the form of graphite which is employed for lubricating the detents or keeper means and the latching member 45. The container is of cap-like form and it is to be secured to the hanger 34 in a manner to have the edge of its rim abut the portion 37 and the inner face of its rim abut the edge of portion 38 of the hanger 34 for the purpose of enclosing the latching member 45, the grooves formed by the detents and the positive stops 44 whereby the lubricant in the container will be applied to said latching member, positive stops and keeper means.

With reference to Figures 3, 4 and 6, the rim of container 48 is indicated at 49 and it is formed with a series of spaced bendable lugs 50 for overlapping portions 37, 38 of hanger 34 whereby the container is secured to such hanger.

With reference to Figure 7 the container, indicated at 51, is secured to the hanger, indicated at 52, by a bayonet slot 53 and a pin 54.

In Figure 8, the container, indicated at 55, is secured to the hanger, indicated at 56 by curved springs 57 carried by the rim 58 of the container and engaging with the hanger 56.

What I claim is:

In a bicycle stand of that type including a foldable and extendible spring-controlled supporting element for the bicycle and a combined coupling and hanger structure for said element, said structure including a depending part, the combination of said depending part, a latching means for said element at said depending part, a cup-shaped lubricant container enclosing and permanently lubricating said latching means, the container at its open end having a portion abutting against said depending part and the upper edge portion at its open end abutting and extending across one face of said depending part whereby the latter will close the open end of the container, and means for securing said container to said depending part in enclosing relation with respect to said latching means.

BERRY COHEN.